United States Patent [19]
Nakamura et al.

[11] Patent Number: 5,781,310
[45] Date of Patent: Jul. 14, 1998

[54] COPYING SYSTEM HAVING IMAGE INPUTTING UNIT AND IMAGE OUTPUTTING UNIT SHARED WITH OTHER IMAGE PROCESSING SYSTEMS

[75] Inventors: Haruka Nakamura, Mishima; Kazutaka Nagata, Tokyo; Yasutoshi Hiroe, Yokohama; Tomoaki Enokida, Tokyo; Kei Sato, Atsugi; Koji Kuwata, Yokohama; Kyouji Omi, Kawasaki, all of Japan

[73] Assignee: Ricoh Company Ltd., Japan

[21] Appl. No.: 839,408

[22] Filed: Apr. 14, 1997

Related U.S. Application Data

[63] Continuation of Ser. No. 216,545, Mar. 23, 1994, abandoned.

[30] Foreign Application Priority Data

Mar. 25, 1993 [JP] Japan ................................. 5-090668
Jun. 17, 1993 [JP] Japan ................................. 5-171111

[51] Int. Cl.$^6$ ................................................. H04N 1/32
[52] U.S. Cl. ........................... 358/468; 358/407; 358/409
[58] Field of Search ............................... 358/400, 401, 358/468, 474, 476, 479, 481, 482, 483, 486, 500, 501, 506, 512, 513, 514, 515, 517, 493, 494, 496, 497

[56] References Cited

U.S. PATENT DOCUMENTS 4,477,833  10/1984  Clark ........................................ 358/525
4,748,514  5/1988  Bell ............................................ 358/486

FOREIGN PATENT DOCUMENTS 64-250737  1/1989  Japan ................................ H04N 1/04

*Primary Examiner*—Thomas D. Lee
*Assistant Examiner*—Jerome Grant, II
*Attorney, Agent, or Firm*—Knoble & Yoshida LLC

[57] ABSTRACT

A copying system is provided in which an image inputting unit and an image outputting unit are connected via a conventional data transmission path, and a copying operation is performed at the same speed as the conventional standalone copying machine. The image inputting unit has a first communicating unit, and the image outputting unit has a second communicating unit. Image data is transferred directly from the image inputting unit to the image outputting unit via the first communicating unit, the transmission path and the second communicating unit after a copying operation is initiated by a controlling unit. A scanning operation of the image inputting unit is performed in synchronization with an image forming operation performed by the image outputting unit.

30 Claims, 14 Drawing Sheets

ARBITRATION IS NOT USED

ARBITRATION IS USED

COPYING SYSTEM HAVING IMAGE INPUTTING UNIT AND IMAGE OUTPUTTING UNIT SHARED WITH OTHER IMAGE PROCESSING SYSTEMS

This is a continuation of application Ser. No. 08/216,545, filed Mar. 23, 1994 now abnd.

BACKGROUND OF THE INVENTION

The present invention generally relates to copying systems, and more particularly, to a copying system in which a unit component, such as an image inputting unit and an image outputting unit, of the copying system can be shared with other image processing systems.

In recent years, various systems for construction of a digital copy machine have been suggested. For example, Japanese Laid-Open Patent Application 64-25673 discloses a system in which each function of the system is independently provided as a module unit. That is, the system comprises module units such as an image processing unit, a scanning unit and a printing unit. The copying function is achieved when those units are packaged into one body. Image data produced by the scanning unit is transmitted through the image processing unit to the printing unit.

FIG. 1 shows a typical construction of the above-mentioned conventional copying machine. In FIG. 1, a scanner 51 scans an original sheet to generate image data. A printer 53 forms an image onto a recording sheet in accordance with the image data. The image data is transferred from the scanner 51 to the printer 53 via an image processing unit (IPU) 52. Additionally, an interface (I/F) 56 is provided to the copying machine, which interface is connected to a data transmission path (not shown in the figure) so that the copying machine can communicate with other devices connected to the transmission path. A controlling unit (SCU) 54 and a panel 55 are provided for controlling a copying operation as well as communication performed by the copying machine.

In the above-mentioned copying machine, the scanner 51 can serve as an independent image inputting unit for an external image processing system. That is, image data generated by the scanner 51 can be transferred via the transmission path to other units as indicated by arrows A and C of FIG. 1. The printer 53 can serve as an independent image outputting unit for an external image processing system. That is, image data generated can be transferred via the transmission path from other units as indicated by arrows D and B of FIG. 1.

An image data transfer from the scanner 51 to the printer 53 is performed via the IPU 52 as indicated by arrows A and B of FIG. 1. The data transfer is performed while a scanning operation is performed in synchronization with an image forming operation of the printer 53. However, an image data transfer via the transmission path and interface 56 is performed in accordance with the conventional data transmission protocol, and thus a predetermined amount of image data, for example image data corresponding to one page of an original sheet, must be transferred at each time. Accordingly, if a copying operation is performed using one scanner and a printer provided in another copying machine connected via the transmission path, the copying operation must be performed one page by one page. This takes a relatively longer time than the copying operation performed using the scanner and the printer provided in the same copying machine.

On the other hand, various image processing systems have been suggested which comprise components having a communicating means so that each component can communicate with other components via a common communication line. For example, one of the systems for the communication is the SCSI system standardized by the American National Standards Institute (ANSI). The system includes a parallel interface for data bits of 8 bits or 16/32 bits. When establishing a copying function using component units having a SCSI interface, an image inputting unit, an image outputting image and an information processing unit should be interconnected according to the SCSI specification so that communication can be made with each other.

The above-mentioned copying system has advantages in that a copy system can be handled as if the copy machine is separated into small units. This results in easy handling in transportation, free installing space and easy maintenance for each unit. Additionally, the function of the copy machine can be upgraded on a per-unit basis which is a merit to the user. Moreover, when manufacturing of the copy machine is concerned, there are advantages in that each unit of the copy machine can be manufactured at a different site (factory), and design changes can be made on a per-unit basis.

When a copy is made in the system, for example, image data corresponding to one page of an original to be copied is produced by scanning by the image inputting unit, and transmitted to the information processing unit through the transmission line. The image data is once stored in the information processing unit and then output to the image outputting unit to reproduce the image data on a recording sheet.

The above-mentioned copying system, which comprises an image inputting unit and image outputting unit connected by transmission line according to the SCSI specification, has a relatively lower copying speed as compared with the stand alone type copy machine. This is because the copying operation must follow the standardized procedure of a SCSI system. That is, a certain amount of image data has to be once stored in the image information unit because the image inputting unit cannot be operated in synchronization with the image outputting unit.

SUMMARY OF THE INVENTION

It is a general object of the present invention to provide an improved and useful image copying system in which the above-mentioned disadvantages are eliminated.

A more specific object of the present invention is to provide an image copying system in which an image inputting unit and an image outputting unit are separately provided from each other, the image inputting unit and the image outputting unit being connected by a conventional data transmission path and being shared with other image processing systems, where the copying operation is performed at the same speed as the conventional standalone copying machine.

In order to achieve the above-mentioned objects, there is provided a copying system comprising:

a transmission path for transmitting image data and command signals;

image inputting means connected to said transmission path for inputting image data, the image inputting means comprising scanning means for scanning an original sheet so as to generate the image data and first communicating means for bidirectionally communicating via the transmission path so as to transfer the image data;

image outputting means connected to said transmission path for outputting an output image, the image outputting means comprising image forming means for forming the output image onto a recording sheet and second communicating means for bidirectionally communicating via the transmission path so as to receive the image data; and controlling means for controlling a copying operation performed by the copying system, the controlling means comprising operating means for inputting operating condition information to the copying system and third communicating means for bidirectionally communicating the image data and command signals between the image inputting means and the image outputting means via the transmission path, the controlling means initiating a copying operation by sending predetermined commands to the image inputting means and the image outputting means, wherein the image data is transferred directly from the image inputting means to the image outputting means after the copying operation is initiated. Preferably, the scanning operation performed by the scanning means of the image inputting means is performed in synchronization with an image forming operation performed by the image forming means of the image outputting means.

Other objects, features and advantages of the present invention will become more apparent from the following detailed description when read in conjunction with the accompanying drawings.

DETAILED DESCRIPTION OF THE PREFERRED EMBODIMENT

Figure 1:
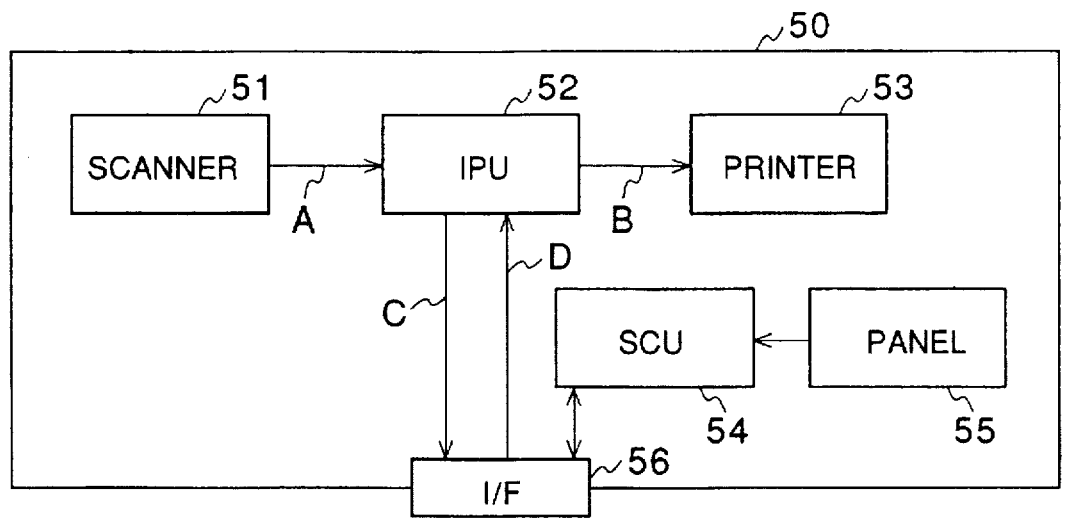
FIG. 1 is an illustration of a construction of an example of a conventional copying machine.
Figure 2:
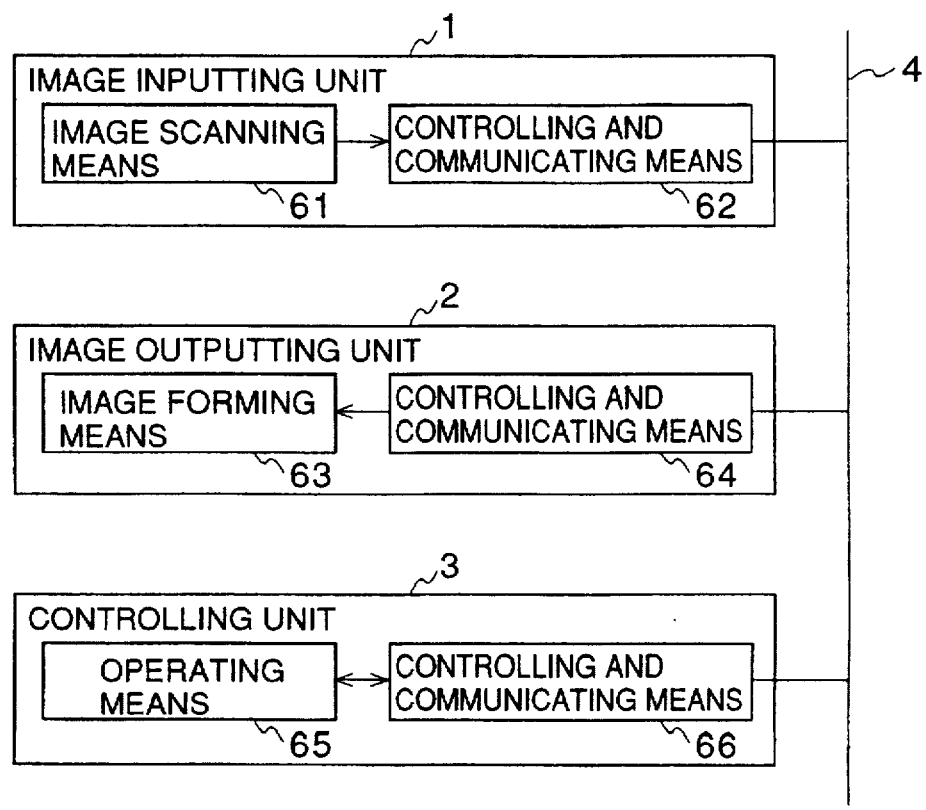
FIG. 2 is a block diagram showing a system construction of the copying system according to the present invention.

A description will now be given of an embodiment of a copying system according to the present invention. FIG. 2 is a block diagram showing a system construction of the copying system according to the present invention. As shown in FIG. 2, the copying system comprises an image inputting unit 1, an image outputting unit 2 and a controlling unit 3. The image inputting unit 1, the image outputting unit 2 and the controlling unit 3 are interconnected via a transmission path 4. The image inputting unit 1 comprises image scanning means 61 for scanning an original sheet and controlling and communicating means 62 so that image data generated by image scanning means 61 can be transmitted from the image inputting unit 1 to the image outputting unit 2 via the controlling and communicating means 62. The image outputting unit 2 comprises image forming means 63 for forming an output image onto a recording sheet and controlling and communicating means 64 so that image data can be received via the transmission path 4 and the controlling and communicating means 64. The controlling unit 3 comprises operating means 65 used for inputting various operating commands and controlling and communicating means 66 so that operating commands can be sent to the image inputting unit 1 and image outputting unit 2 via the transmission path 4. A copying operation is initiated by sending a copy command to the image outputting unit 2, and image data is directly transferred from the image inputting unit 1 to the image outputting unit 2 after the copying operation has been initiated. The transmission path 4 is a conventional type used in a SCSI system, and thus other data processing units such as a personal computers or peripheral devices may be connected to the transmission path 4 to communicate with each other.

Figure 3A:
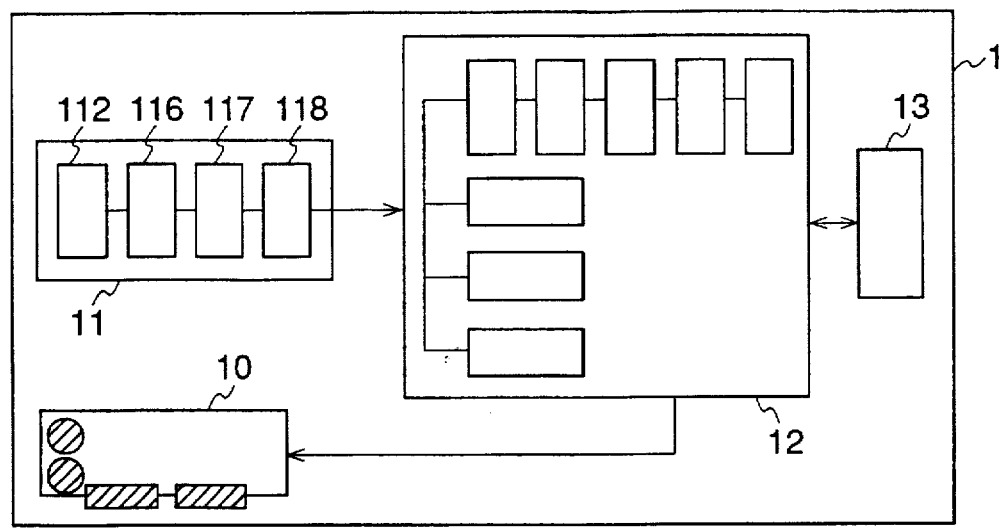
FIG. 3A is a block diagram of the image inputting unit of FIG. 2.
Figure 3B:
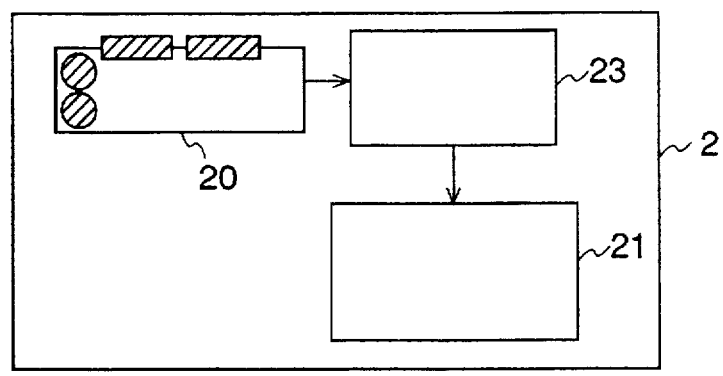
FIG. 3B is a block diagram of the image outputting unit of FIG. 2.
Figure 3C:
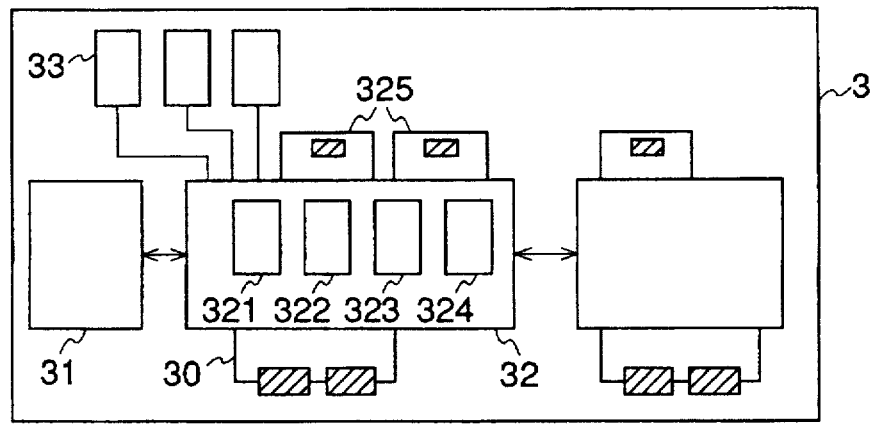
FIG. 3C is a block diagram of the controlling unit of FIG. 2.
Figure 4A:
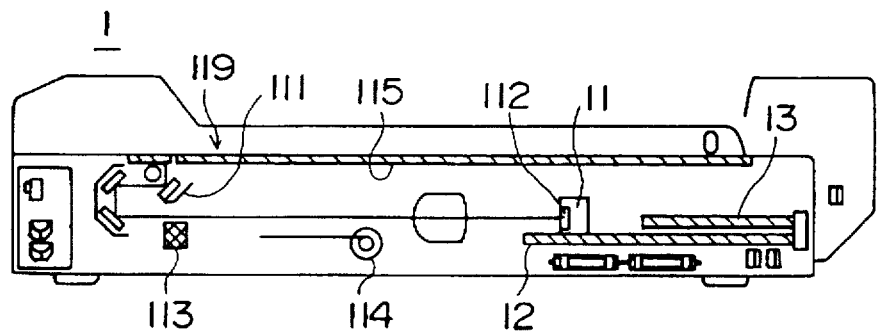
FIG. 4A is a view outlining a structure of the inputting unit.
Figure 4B:
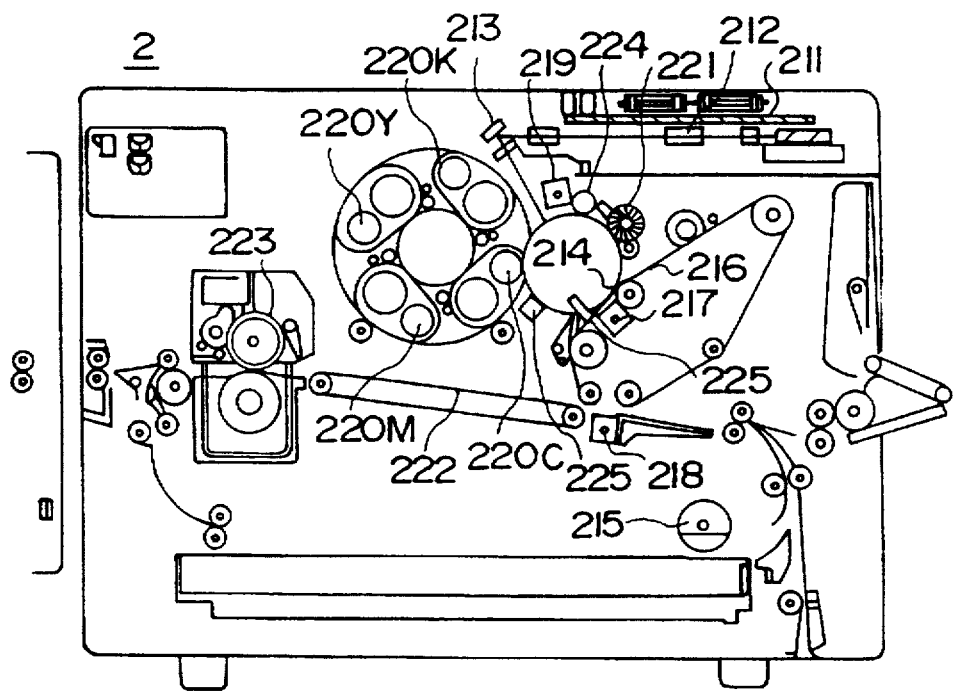
FIG. 4B is a view outlining a structure of the outputting unit.
Figure 4C:
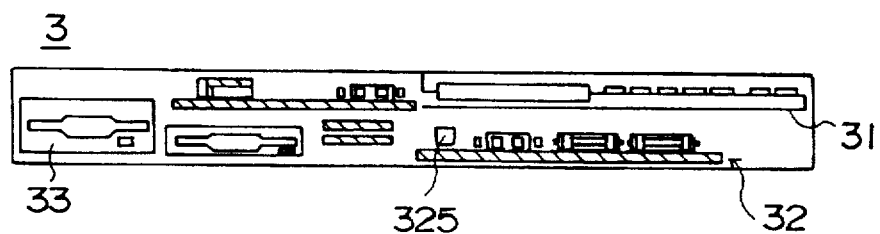
FIG. 4C is a view outlining a structure of the controlling unit.

A description will now be given, with reference to FIGS. 3A through 4C, of structures of the units 1, 2 and 3. FIG. 3A is a block diagram of the image inputting unit 1; FIG. 3B is a block diagram of the image outputting unit 2; FIG. 3C is a block diagram of the controlling unit 3. FIG. 4A is a view outlining a structure of the inputting unit 1; FIG. 4B is a view outlining a structure of the outputting unit 2; FIG. 4C is a view outlining a structure of the controlling unit 3.

The image inputting unit 1 comprises, as shown in FIG. 3a, an image scanning unit 11, a basic image processing unit 12 and an extended image processing unit 13. The image inputting unit 11 further comprises a controlling and communicating unit 10 for sending image data to the transmission path 4. The image scanning unit 11 comprises, similar to a conventional scanning device, a color image sensor device 112, an A/D converter 116, a shading correction circuit 117 and a sampling position compensating circuit 118.

As shown in FIG. 4A, the image inputting unit 1 comprises a carriage 111, a carriage home sensor 113, a stepping motor 114 and a platen 115. An original sheet is placed on the platen 115, and a scanner carried by the carriage 111 scans the original sheet. The carriage is moved along the secondary scanning direction by the stepping motor 114. Before a scanning operation starts, the carriage is positioned directly above the carriage home sensor 113. When scanning operation is started, the carriage 111 is moved to the right in the figure. When the carriage reaches a position just out of the detection range of the carriage home sensor 113, the position data of the carriage 111 is stored as a reference position data.

The controlling and communicating unit 10 calculates the time period to be taken to reach the front end 119 of the original sheet and determines an appropriate pulse train to be supplied to the stepping motor 114 in accordance with the optimum acceleration scheme.

After the carriage 111 has passed the reference point, the color image sensor device 112 starts to scan a main scan line of each color at 16 pixels to 1 mm. The color image sensor device 112 scans first a reference white plate, and background data obtained by scanning the reference white plate is converted into 8-bit digital data by the A/D converter 116. The background data is then supplied to the shading correction circuit 117. Data scanned thereafter is corrected in accordance with the background data stored in the shading correction circuit 117.

After the scanning point has reached the front end 119 of the original sheet, an analog voltage signal corresponding to the light of each component color, R, G and B, reflected by the original sheet is output from the color image sensor device 112. The signal is converted by the A/D converter 116 into an 8-bit digital quantization code signal (i.e. having 256 gradations), and supplied to the basic image processing unit 12.

After the entire surface of the original sheet has been scanned and the scanning point has reached the opposite end of the original sheet, the rotating direction of the stepping motor 114 is reversed to return the carriage to the home position.

Figure 5:
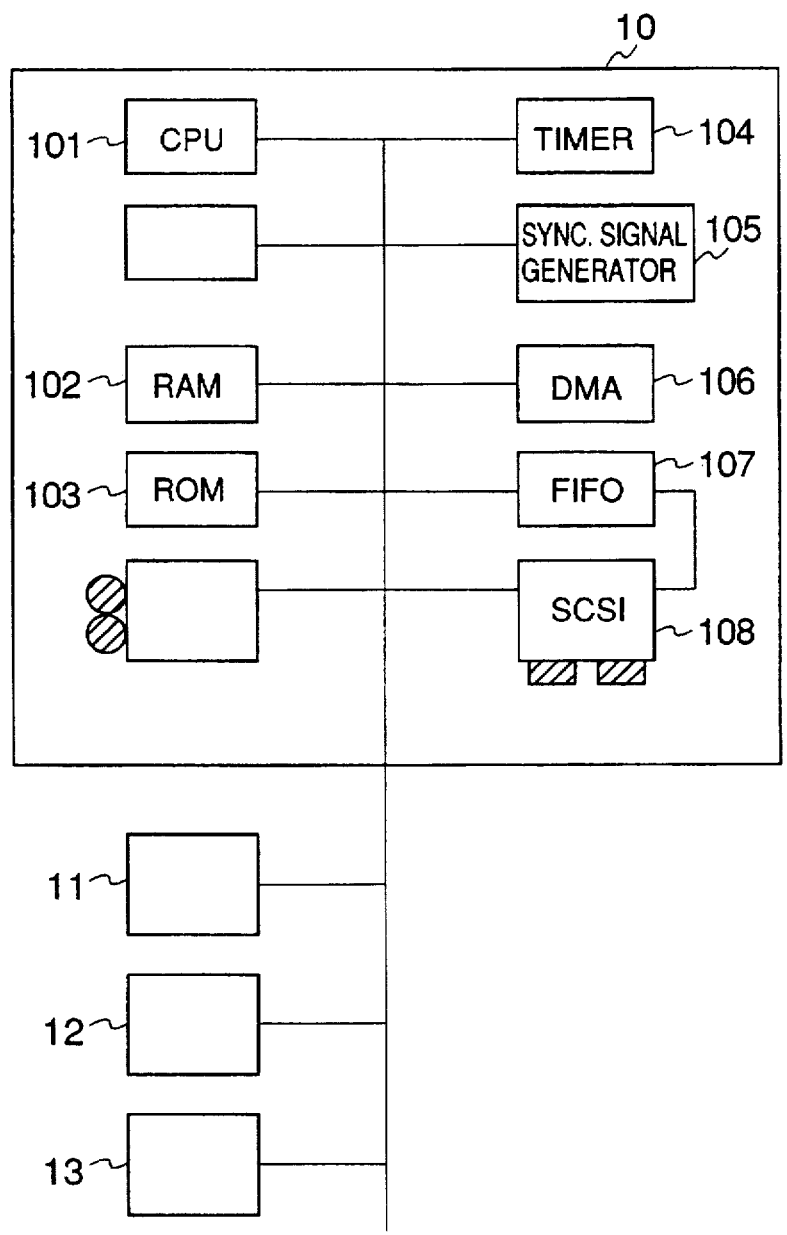
FIG. 5 is a block diagram showing a structure of the controlling and communicating unit 10.

FIG. 5 is a block diagram showing a structure of the controlling and communicating unit 10. As shown in FIG. 5, the controlling and communicating unit 10 comprises a micro processor 101, a RAM 102, a ROM 103, a timer counter 104, a synchronization signal generator 105, a direct memory access (DMA) controller 106, a first-in first-out (FIFO) buffer 107 and SCSI controller 108. The controlling and communicating unit 10 communicates with the controlling unit 3 and image outputting unit 2 in accordance with a predetermined protocol, and controls an image scanning operation in accordance with commands received from the controlling unit 3. Image data obtained by scanning the original sheet is transferred to the image outputting unit 2 via the transmission path 4.

In a color copy mode, since the outputting unit 2 uses a method in which four color images, that is C, M, Y, K, are sequentially formed, four scanning operations are needed for a single original sheet. Accordingly, the image inputting unit 1 sends image data of a single color at every scanning operation.

A description will now be given of the image outputting unit 2. As shown in FIG. 3B, the image outputting unit 2 comprises a controlling and communicating unit 20, an image forming unit 21 and a recording controlling circuit 23. The controlling and communicating unit 20 has the same hardware construction as the controlling and communicating unit 10 of the image inputting unit 1.

The controlling and communicating unit 20 communicates with the controlling unit 3 and image inputting unit 1, and receives the image data transferred from the image inputting unit 1. The image data is then supplied to the recording controlling circuit 23. The controlling and communicating unit 20 controls the entire operation of the outputting unit 2.

As shown in FIG. 4B, the image outputting unit 2 comprises a laser diode 211, an fθ lens 212, a mirror 213, a photosensitive drum 214, a paper supply roller 215, an intermediate transfer belt 216, a primary transfer corotron 217, a secondary transfer corotron 218, a charge corotron 219, a cleaner 221, a conveying belt 222, fixing roller 223, driving motor 224 and image position detector 225. Further, the image outputting unit 2 comprises developing units for cyan, magenta, yellow and black, respectively indicated by notations 220C, 220M, 220Y and 220K.

The image outputting unit 2 forms a full color image in accordance with the image data of each color CMYK supplied via the controlling and communicating unit 20. When the image forming operation is started, the photosensitive drum 214 rotates counterclockwise. A C (cyan) latent image is formed on the photosensitive drum 214 and then the C toner image is developed. Similarly, M (magenta), Y (yellow) and K (black) toner images are developed sequentially. These toner images are finally transferred onto the intermediate transfer belt 216, which rotates in synchronization with the photosensitive drum 214, using a corona transfer technique. The image forming operation of each color image is performed by a known technique using raster exposure. It should be noted that the M toner image, the Y toner image and the K toner image must be superimposed exactly on the C toner image on the intermediate transfer belt 216. This is achieved by using a timing signal generated by detecting a registration mark. The registration mark is formed a predetermined distance ahead of the C toner image when the C toner image is formed.

A description will now be given of a controlling unit 3. As shown in FIG. 3C and FIG. 4C, the controlling unit 3 comprises a controlling and communicating unit 30, an operating unit 31, a system controlling unit 32 and a memory unit 33. The system controlling unit 32 comprises a copy controlling unit 321, a facsimile communication unit 322, a print controlling unit 323, image processing unit 324 and a connector 325. The controlling and communicating unit 30 has the same hardware construction as the controlling and communicating unit 10 of the image inputting unit 1.

The controlling unit 3 is interconnected with other subsystems, such as the image inputting unit 1 and the image outputting unit 2, via the transmission path 4, and controls the entire operation of the copying system. Instructions given by an operator are input via the operating unit 31 having an operational keyboard and a display unit. The status of the copying operation and messages for the operator can be displayed on the display unit of the operating unit 31.

In the above-mentioned copying system in which the image data is transferred via the commonly used conventional transmission path, it is important that the image forming operation is performed in synchronization with the image scanning operation performed by a different unit. This is more important, in particular, in a case where a color copying operation is performed because additional synchronization has to be achieved for each component image.

Figure 6:
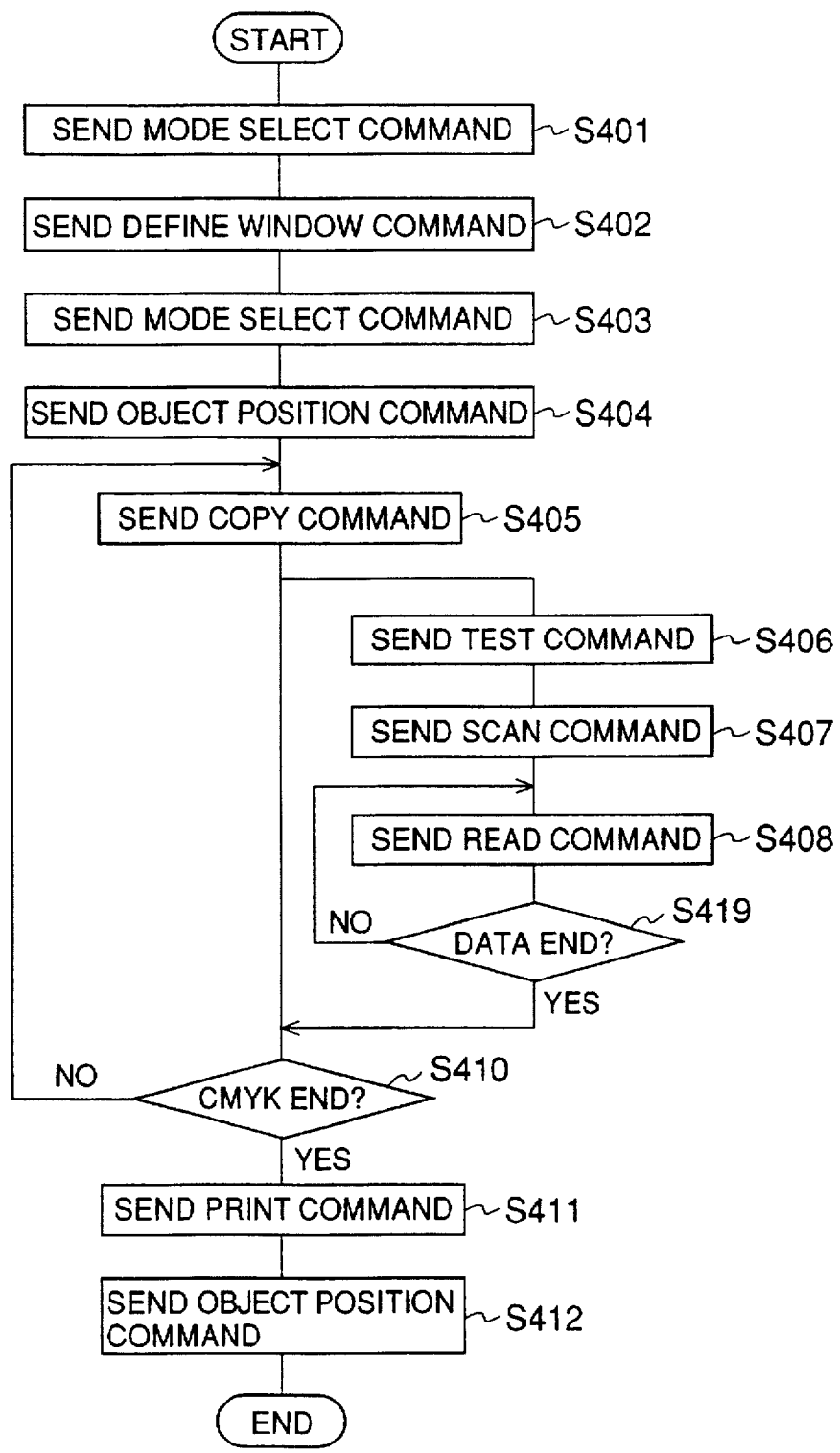
FIG. 6 is a flow chart of a communication procedure of a copying system according to the present invention.
Figure 7:
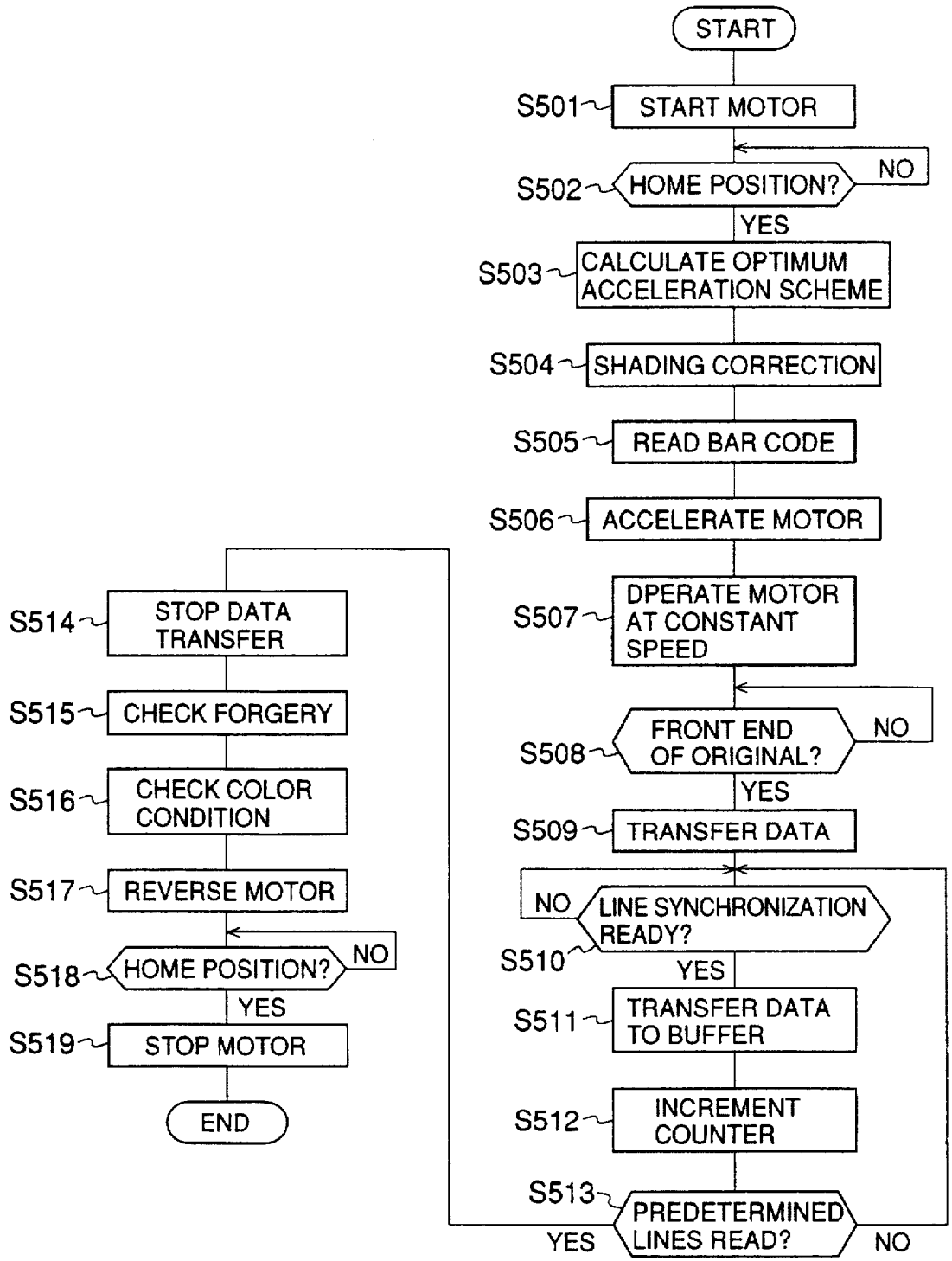
FIG. 7 is a flow chart of an operation performed in the image inputting unit of FIG. 2.
Figure 8:
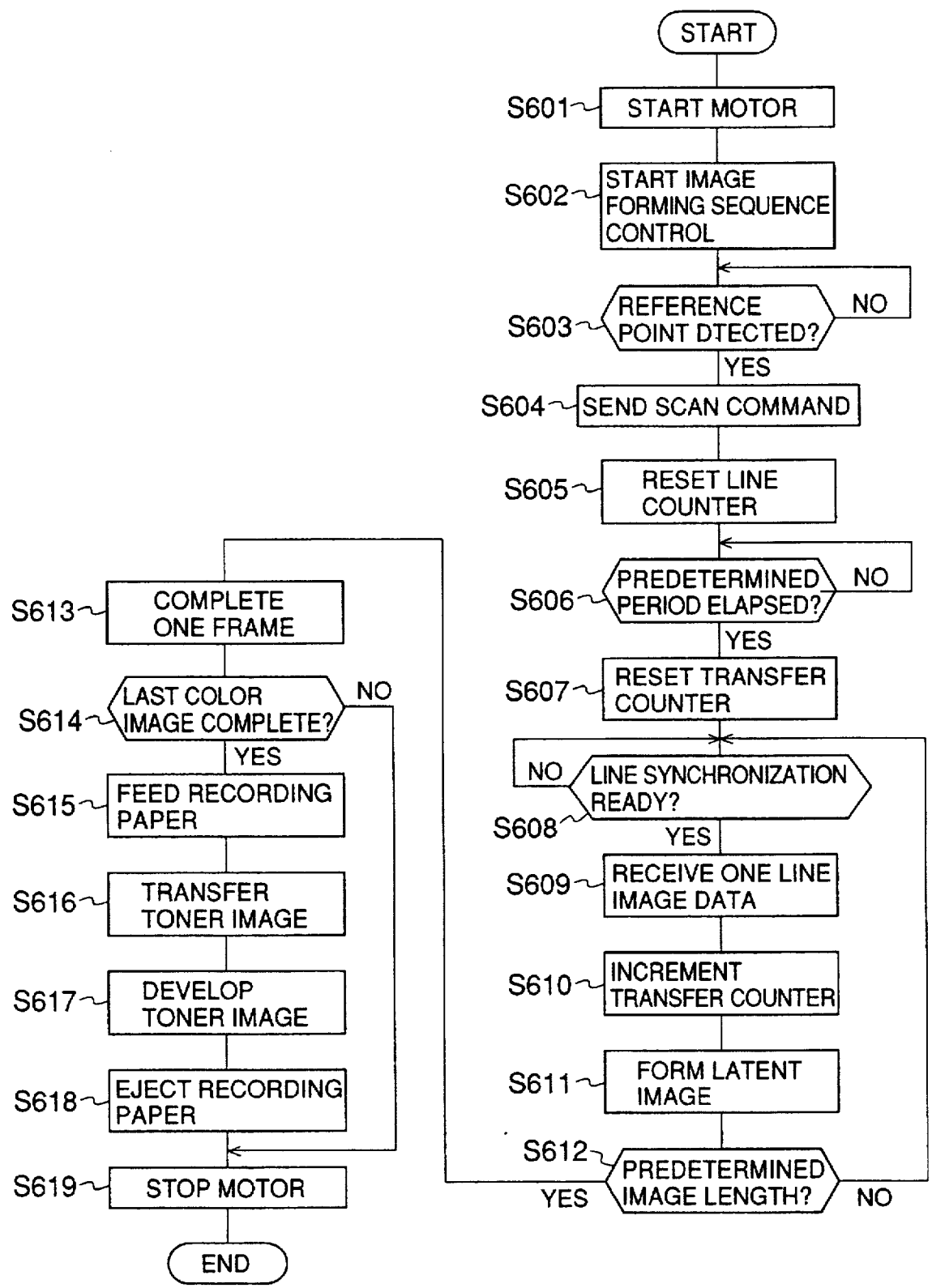
FIG. 8 is a flow chart of an operation performed in the image outputting unit of FIG. 2.

A description will now be given of a copying operation performed by the copying system according to the present invention. FIG. 6 is a flow chart of a communication procedure. FIG. 7 is a flow chart of an operation performed in the image inputting unit 1. FIG. 8 is a flow chart of an operation performed in the image outputting unit 2.

The copying system according to the present embodiment uses a SCSI system. In the SCSI system, a subsystem (device), which has a SCSI interface and is connected to an SCSI bus (common transmission path), functions as either an initiator or a target. The initiator is a device which has the priority for using an SCSI bus and requests other devices (targets) to perform an operation. The target is an SCSI device which performs an operation requested by the initiator. Generally, a host computer acts as an initiator.

Figure 9:
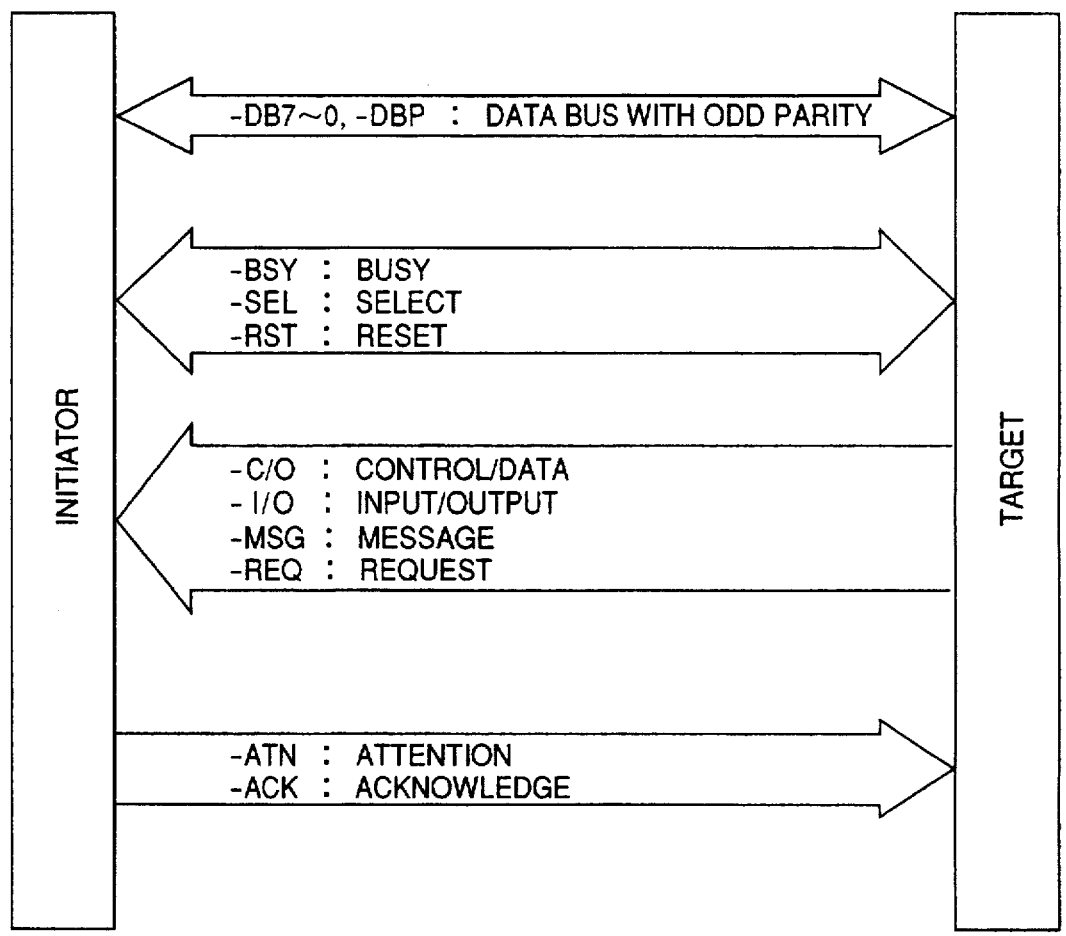
FIG. 9 is an illustration showing interface signals between the initiator and the target.
Figure 10A:
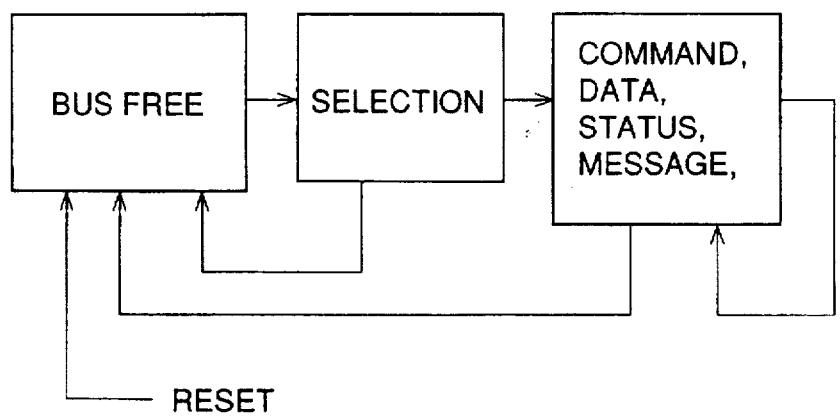
FIGS. 10A and 10B are illustrations for explaining a bus phase.
Figure 10B:
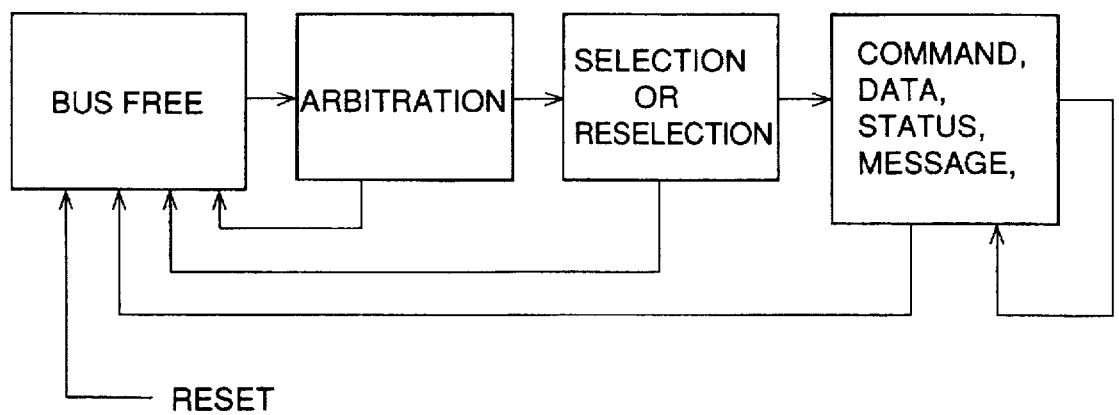

FIG. 9 is an illustration showing interface signals between the initiator and the target. FIGS. 10A and 10B are illustrations for explaining a bus phase. When the SCSI bus is not in use, the bus phase is in a bus free phase as shown in FIGS. 10A and 10B. Transfer from the bus free phase to the next phase is dependent on whether or not arbitration is used. In a case where arbitration is not used, the initiator sets, as shown in FIG. 10A, the signals shown in FIG. 9 to a predetermined state to start a selection phase. The target cannot start the selection phase by itself. When the target receives from the initiator the above signals and set signals shown in FIG. 9 to a predetermined state, the selection phase ends, and the bus phase transfers to the information transfer phase. In the information transfer phase, data, commands, status information and messages are transferred via a common data bus (refer to FIG. 9). The target determines the kind of information transfer phase and notifies the initiator in accordance with the four kinds of information and its transferring direction, and then the information is transferred. If arbitration is used, as shown in FIG. 10B, the initiator starts an arbitration phase by setting signals shown in FIG. 9 to a predetermined state. The arbitration phase ends when the target responds. Then the selection phase is started by the target or a reselection phase is started by the target.

In the present copying system, initially, the controlling unit 3 is set as the initiator, and the image inputting unit 1 and the image outputting unit 2 are set as targets. An operation described below starts at the time when a copy key of the operating unit 31 of the controlling unit (hereinafter called SCU) 3 is pressed under a condition where each unit is set in the information transfer phase.

In FIG. 6, when a copying operation is started by an operator pressing a copy key, SCU 3 sends, in step 401 (hereinafter step is abbreviated S), a mode select command to the image inputting unit (hereinafter called SCN) 1 via the transmission path 4. By the mode select command, selections are made for functions of the SCN 1. The functions of the SCN 1 include whether or not an auto document feeder (ADF) is to be used, whether intensity of the image should be increased or decreased, whether the resolution of scanning is photograph-level, or the like. In the copying operation shown in FIG. 6, the ADF is selected.

In S402, SCU 3 sends a define window command to SCN 1 to set an area to be scanned. The SCU 3 then sends, in S403, a mode select command to the image outputting unit (hereinafter called PRN) 2 to set necessary conditions including selection of a paper supplying tray (paper size) and selection of bins for ejected papers. Accordingly, the SCU 3 obtains information for the paper supplying tray from the operator or from SCN 1, and obtains information for the bins for the ejected papers from the operator.

In S404, the SCU sends an object position command to SCN 1 so that the original sheet set in the ADF (not shown in the figure) is set on the platen 115. The SCU 3 then sends, in S405, a copy command to PRN 2 so that the recording paper in the paper supplying tray 226 is fed to a register. After the copy command is sent, PRN 2 is set as an initiator with respect to SCN 1. That is, PRN 2 is a target with respect to SCU 3 while being an initiator with respect to SCN 1.

Because only SCU 3 is set as an initiator in the above operation from S401 to S405, SCN 1 and PRN 2 can act as subsystems of other systems. Accordingly, an operating unit for inputting various commands is provided only to SCU 3. However, once the initial conditions are set as mentioned above, PRN can be set as an initiator in order to achieve a direct communication between PRN 2 and SCN 1 so that a scanning operation performed by SCN 1 and an image forming operation performed by PRN 2 can be simultaneously performed.

PRN 2 as an initiator sends, in S406, a test command so as to check whether or not SCN 1 is set in a condition where scanning can be started. That is, it is determined whether or not the original sheet is set to a predetermined position, and the carriage 111 is in a home position directly above the carriage home sensor 113.

When PRN 2 receives, in S406, a response that SCN 1 is ready to start a scanning operation, the motor 224 of the PRN 2 is rotated to start an image forming operation. This step is described as S601 in the flow chart of FIG. 8. When the image forming operation has started, an image forming sequence control is started in S602, and it is determined, in S603, whether or not the reference point described before is detected. The reference point corresponds to the registration mark to be detected by the image position detector 225. Although, as previously described, only the color component images other than the C toner image needed to be formed in synchronization with a registration mark formed on the intermediate transfer belt 216, the following operation is described for a case where a fixed reference point is formed on the belt 216. In this case, image scanning operations for all color component images are performed in synchronization with the fixed reference point so that all color images are exactly superimposed in the corresponding image.

When the reference point is detected, PRN 2 sends, in S604 (S407), a scan command to SCN 1. SCN 1 then starts to rotate, in S501 of FIG. 7, the stepping motor 114 so as to move the carriage 111. In this manner, the movement of the carriage 111 is synchronized with the movement of the intermediate transfer belt of PRN 2. The carriage 111 then moves to the scanning start position, as previously mentioned, by following S502 through S506.

After the carriage 111 reaches the scanning start position, the carriage 111 is moved, in S507, at a constant speed, and it is determined, in S508, whether or not the carriage 111 has reached the front end 119 of the original sheet 119. If it is determined that the carriage 111 has reached the front end 119, and when the data transmission is allowed in S509, scanning of the first line is started after a primary scanning counter is set to 0 in S510.

It should be noted that although the scanning speed of SCN 1 is set to the same as that of PRN 2, the scanning speed of SCN 1 may be slightly faster than that of PRN 2. Additionally, the secondary scanning speed is dependent on the primary scanning speed. That is, the count number of the primary scanning lines corresponds to the number of pulses supplied to the stepping motor 114 which provides movement of the carriage 111 in a secondary scanning direction. The carriage moves one line when a predetermined number of pulses are supplied to the stepping motor 114. It should be noted that circuits related to synchronization are included in the synchronization generator 105. Similarly, the secondary scanning speed of PRN 2 is dependent on the primary scanning speed of PRN 2. Additionally, the moving speed of the intermediate transfer belt 216 of PRN 2 is also dependent on the scanning speed of PRN 2.

In S510, it is determined whether or not line synchronization is completed. If the calculated number of pulses are supplied in a predetermined period, as previously described, to the stepping motor 114, the carriage 111 moves to a determined position at the predetermined time, and thus the line synchronization is completed. In S511, transfer of the scanned image data to the FIFO buffer 107 is started. As previously mentioned, the scanned image data is supplied to the FIFO buffer 107 via the A/D converter 116 and the basic image processing unit 12. That is, the analog signal obtained by scanning the original sheet is sampled at a predetermined sampling frequency, and converted into 8-bit digital data. The digital data is then processed by the basic processing unit 12, and the two most significant bits are, for example, supplied to the FIFO buffer 107 as data to be transferred to PRN 2.

In the present copying system, only 2-bit digital data corresponding to 4 gradation levels is transferred to PRN 2 since 8-bit digital data corresponding to 256 gradation levels are not necessary. By setting the number of gradation levels to 4, the transferring period can be reduced so as to be appropriate to the conventional SCSI bus, and thus the condition is realized in which simultaneous operation of SCN 1 and PRN 2 can be performed.

Referring now to the flow chart of FIG. 8, after PRN 2 sends the scan command to SCN 1, the line counter is reset in S605. It is determined, in S606, whether or not a predetermined period has elapsed. If it is determined that the predetermined period has elapsed, the transfer counter is reset, in S607, and then it is determined, in S608, whether the line synchronization is completed similarly to that performed in SCN 1. PRN 2 then sends, in S408 of FIG. 6, a read command to SCN 1. The time period from sending the scan command to sending the read command to SCN 1 corresponds to the time period from the time when the first line is written on the photosensitive drum to the time when the first line reaches the predetermined position of the intermediate transfer belt 216.

By the time SCN 1 receives the read command, image data corresponding to a few lines has been already stored in the FIFO buffer 107. Even if the scanning speed of SCN 1 is designed to be the same as the scanning speed of the PRN 2, there is a possibility that the scanning speed of SCN 1 becomes slightly slower or faster than the scanning speed of PRN 2 due to allowances in each scanning speed. When the scanning speed of PRN 2 becomes slower than the scanning speed of SCN 1, the FIFO buffer 107 should have a capacity to store the image data corresponding to $\alpha$ lines. When the scanning speed of SCN 1 becomes slower than the scanning speed of PRN 2, the FIFO buffer 107 should store the image data corresponding to $\beta$ lines before the read command is received. Accordingly, the capacity of the FIFO buffer 107 should be $\alpha+\beta$ lines. In the present embodiment, the required capacity of the FIFO buffer 107 is 2 to 3 lines. The scanning speed of SCN 1 may be set at a predetermined speed slower than the scanning speed of PRN 2 so that maximum allowance of the scanning speed of SCN 1 never exceeds the scanning speed of PRN 2.

The read command from PRN 2 to SCN 1 is sent every line or every few lines. Data transmission to the FIFO buffer 107 in SCN 1 is performed with line synchronization regardless of the read command. That is, the primary scanning counter is incremented, in S512, and it is determined, in S513, whether a predetermined number of lines have been read. If the predetermined number of lines have not been read, the routine returns to S510. If the primary scanning counter is 0, the carriage 111 has proceeded one line. Accordingly, the scanning for one line is performed and the scanned data is transferred to the FIFO buffer 107. If it is determined, in S513, that the predetermined number of lines have been read, the data transfer is stopped in S514. Other data processing operations, such as checking for forgery and color conditions, are then applied to the image data, in S515 and S516, and then, in S517, the rotation of the stepping motor 114 is reversed so that the carriage returns to the home position. After the stepping motor 114 has returned to the home position, in S518, the stepping motor 114 is stopped, in S519, and then the routine ends.

Referring now to FIG. 8, after PRN 2 has received, in S609, one line of image data in the buffer thereof, the transfer counter is incremented in S610. In S611, the recording controlling circuit 23 reads out image data in the buffer so as to form a latent image corresponding to one line on the photosensitive drum. In S612, it is determined whether or not the value of the line counter is a predetermined number. If the value has not reached the predetermined number determined by the length of the original image, the routine returns to S608 so as to send the read command to SCN 1. It should be noted that although in the present embodiment the read command is sent at every line, the read command may be sent every few lines. As mentioned above, transferring of image data corresponding to predetermined lines is completed (refer to S409 of FIG. 6), and forming of a latent image corresponding to one frame (one component color) is completed in S613. The development of the latent image is completed a predetermined time later.

On the other hand, before formation of the latent image of one frame is completed, the leading edge (the first line) reaches the predetermined position of the intermediate transfer belt, and the toner image is transferred onto the intermediate transfer belt.

The above-mentioned image forming operation is repeated for every color component image so that all the color toner images are transferred onto the intermediate transfer belt in a superimposed relationship.

When it is determined, in S614, that transfer of the last color image has been completed, a recording paper is fed, in S615, and the toner image on the intermediate transfer belt is transferred onto the recording paper in S616. The toner image is then fixed, in S617, and the recording paper is ejected in S618. The motor 224 is then stopped, and the printing operation ends. The steps from S614 to S619 corresponds to the steps from S410 to S412 of FIG. 6.

As described in detail later, since the image inputting unit 1 and the image outputting unit 2 are constructed as separate units, one image inputting unit 1 can be used with various image outputting units having various scanning speed for image formation. In order to minimize the capacity of the FIFO buffer 107, image data supply to the FIFO buffer 107 must be dependent on the outputting speed of the data stored in the FIFO buffer 107, the outputting speed of the FIFO buffer 107 corresponding to the transfer speed of the transmission path 4. One method to achieve the above is to vary the scanning speed of the image inputting unit 1 so as to correspond to the scanning speed of the image outputting unit 2 being used.

In order to achieve this, a clock signal is provided which has a frequency sufficiently higher than that of the scanning clock frequency of the image inputting unit and the image outputting units which may be used with the image inputting unit so that the polarity of the scanning clock signal pulse of the image inputting unit is reversed every n pulses of the scanning clock signal of the image outputting unit. For example, a clock signal having a frequency 2n times that of the image outputting unit is provided. If the scanning speed of the image inputting unit becomes higher, the polarity of the scanning clock pulse of the image inputting unit is changed every n−α pulses (n and α are positive integers, n>α). If the scanning speed of the image inputting unit becomes lower, the polarity of the scanning clock pulse of the image inputting unit is changed every n+α pulses.

Another method is to set the average scanning speed of the image inputting unit to be the same as the scanning speed of the image outputting unit. That is, the scanning speed of the image inputting unit is set to the maximum scanning speed of the image outputting unit, and the scanning operation of the image inputting unit is intermittently performed. The rest period of the scanning operation performed by the image inputting unit becomes longer as the scanning speed of the image outputting unit becomes slower. The rest period is provided at every line or at every a few lines. Since the carriage 111 is driven by the stepping motor 114, the secondary scanning can be stopped at every line or every a few lines. That is, a predetermined number of pulses, which can be determined by the necessary scanning speed, are supplied to the stepping motor in a predetermined period.

In the above-mentioned method, the timing for supplying the pulses to the stepping motor 114 in the rest period can be determined by the microprocessor 101 provided in the controlling and communicating unit 10. The microprocessor 101 can obtain the scanning speed of the image outputting unit, that is, the outputting speed of the FIFO buffer, by a method described in detail later. The microprocessor 101 calculates a secondary scanning time period of the image inputting unit when the stepping motor is stopped for every scan line. The calculated number of pulses are supplied at a time determined by the calculated secondary scanning time period. The primary scanning counter starts to count at this time.

The restart of the primary and secondary scanning may be performed in synchronization with the request for transferring data (read command). As mentioned above, the read commands are received for every line or every a few lines. Accordingly, the number of lines to be scanned corresponds to the duration of each request for transfer. Therefore, in this case, counting of the primary scanning counter should be stopped and reset to 0 when the stepping motor is stopped and another request for transfer should be waited for. When the next request for transfer is received, the image data stored in the FIFO buffer is output and primary scanning is started to store the next image data in the FIFO buffer.

Figure 11:
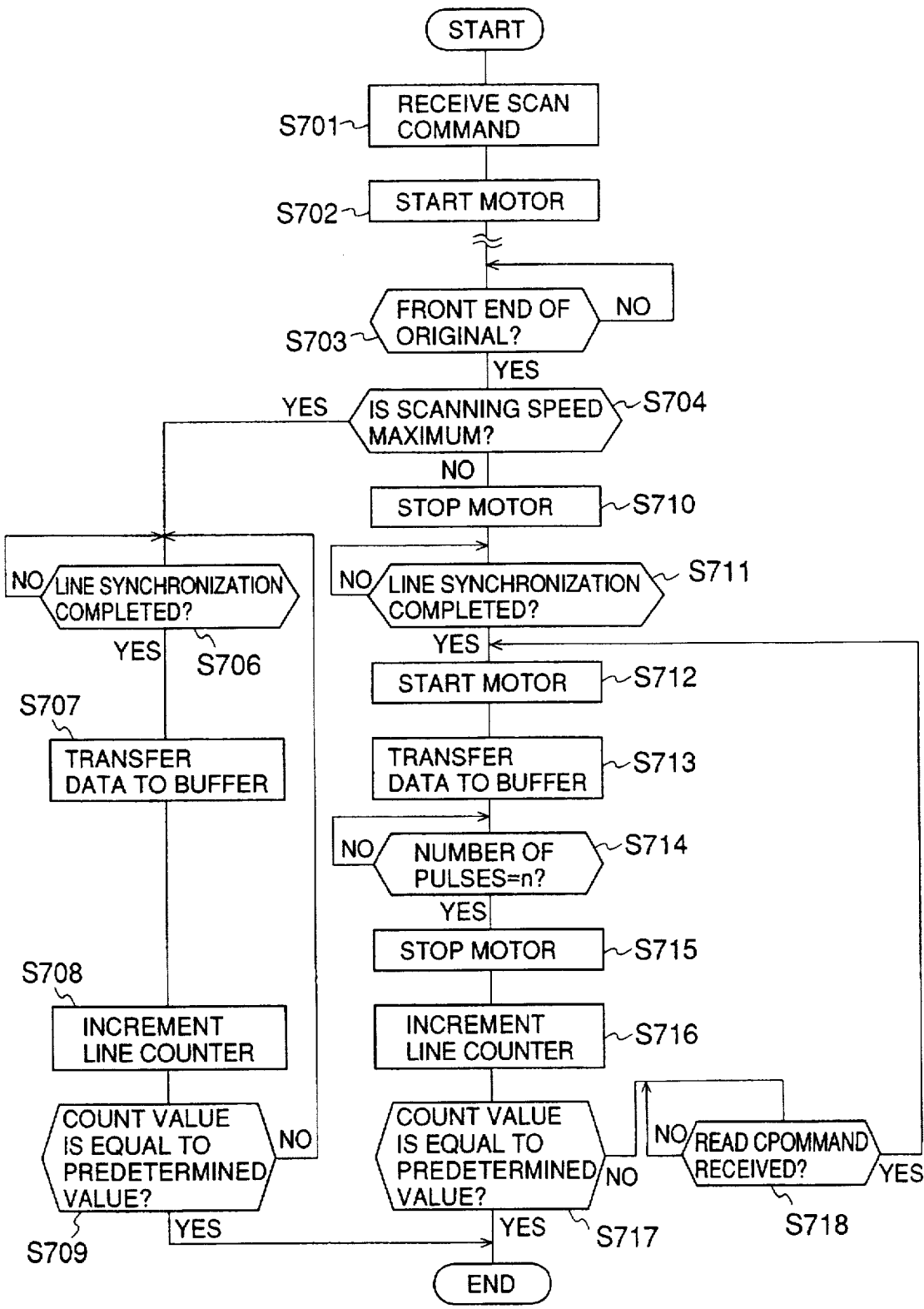
FIG. 11 is a flow chart of an example of an operation performed in the image outputting unit.

A description will now be given, with reference to the flow chart of FIG. 11, of an example of operation in which the scanning speed information is included in the scan command and the primary and secondary scanning for a single line is restarted by means of the read command.

When the image inputting unit 1 has received, in S701, the scan command including the scanning speed information of the image outputting unit 2, the stepping motor 114 is rotated, in S702, so as to move the carriage 111 to the position where the front end 119 of the original sheet is located. If it is determined, in S703, that the carriage has reached the front end 119, it is determined, in S704, whether or not the scanning speed of the image outputting unit 2 is equal to the scanning speed of the image inputting unit 1. If yes, the routine proceeds to S706 where it is determined whether or not line synchronization is established. When the line synchronization is established, image data is transferred, in S707, to the FIFO buffer 107, and the line counter is incremented in S708. In S709, it is determined whether or not the value of the line counter is equal to a predetermined number corresponding to the length to be scanned along the secondary scanning direction. If the value of the line counter has not reached the predetermined number, the routine returns to S706 to repeat S706 to S709. If yes in S709, the routine ends.

If it is determined, in S704, that the scanning speed of the image outputting unit 2 is slower than that of the image inputting unit 1, the routine proceeds to S710 where the stepping motor 114 is stopped. In S710, it is determined whether or not the line synchronization is established. When it is determined that the line synchronization is established, the stepping motor 114 is restarted, in S712, and then the image data is transferred, in S713, to the FIFO buffer 107. Thereafter, it is determined, in S714, whether or not the predetermined number of pulses (n pulses) have been supplied to the stepping motor 114, and if yes, the stepping motor 114 is stopped in S715. The line counter is then incremented in S716 and the routine proceeds to S717. In S717, it is determined whether or not the value of the line counter is equal to a predetermined number corresponding to the length to be scanned along the secondary scanning direction. If the value of the line counter has not reached the predetermined number, the routine proceeds to S718 where it is determined whether or not the read command is received. If it is determined that the read command is received, the routine returns to S712 to repeat S712 to S718. On the other hand, if yes in S717, the routine ends.

It should be noted that the scanning speed information of the image outputting unit is sent from the image outputting unit 2 or controlling unit 3 to the image inputting unit 1. When the controlling unit 3 sends the information, the information must be sent from the image outputting unit 2 to the controlling unit 3 beforehand. This transfer of the scanning speed information is performed, for example, when the outputting unit 2 is added to the system configuration. The scanning speed information is received by the management software stored in the ROM provided in the controlling and communicating unit 30 of the controlling unit 3. The management software manages the function and performance of each subsystem in the system structure. That is, the scanning speed of the image outputting unit 2 is registered as the performance of one of the subsystems, and before a copying operation is started, the scanning speed information is sent to the image inputting unit, for example, by means of the mode select command (refer to S401 of FIG. 6).

The scanning speed information may be directly transferred from the image outputting unit 3 to the image inputting unit 1 by inserting the scanning speed information into the scan command. It should be noted that the image inputting unit 1 may retain the scanning speed information provided by the image outputting unit 2 in a memory for the next operation with the same image outputting unit.

The above description has been made referring to the embodiment of a copying system in which one image inputting unit 1, one image outputting unit 2 and one controlling unit 3 are provided. In addition to the above system, other system configurations may be established using the subsystems mentioned above as shown in FIGS. 12A through 12E.

Figure 12A:
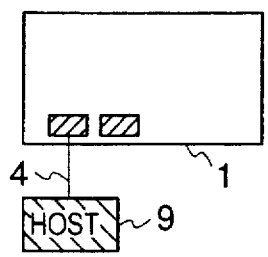
FIG. 12A is an illustration showing a case where the image inputting unit serves as an inputting device for an information processing device.

FIG. 12A shows a case where the image inputting unit 1 serves as an inputting device for an information processing device 9. The information processing device 9 may be a conventional general purpose computer or exclusive information processing device.

Figure 12B:
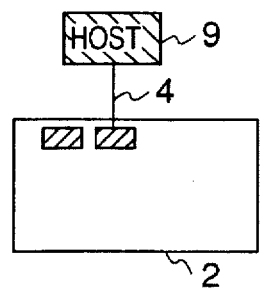
FIG. 12B is an illustration showing a case where the image outputting unit serves as an outputting device for an information processing device.

FIG. 12B shows a case where the image outputting unit 2 serves as an outputting device for an information processing device 9. The information processing device 9 may be a conventional general purpose computer or exclusive information processing device.

Figure 12C:
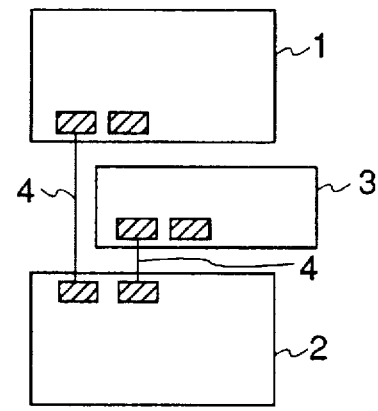
FIG. 12C is an illustration showing an example corresponding to the construction shown in FIG. 2.

FIG. 12C shows a case corresponding to the aforementioned embodiment.

Figure 12D:
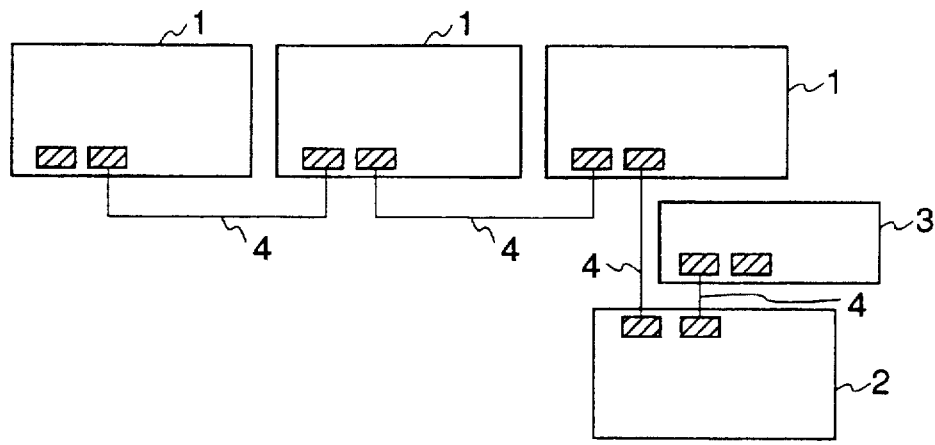
FIG. 12D is an illustration showing a case where a plurality of image inputting units 1 are provided in the system shown in FIG. 15C.

FIG. 12D shows a case where a plurality of image inputting units 1 are provided in the system shown in FIG. 12C. This system has an advantage in that the system functions as if there are provided three copying machines. That is, three kinds of inputting operation, for example, one for A1 size paper, one for A3 size paper and one for color images, can be performed using the system. In the above construction, the controlling unit 3 is provided with controlling means for controlling multiple printing tasks. Similarly to this construction, the system may be provided with a plurality of outputting units 2.

Figure 12E:
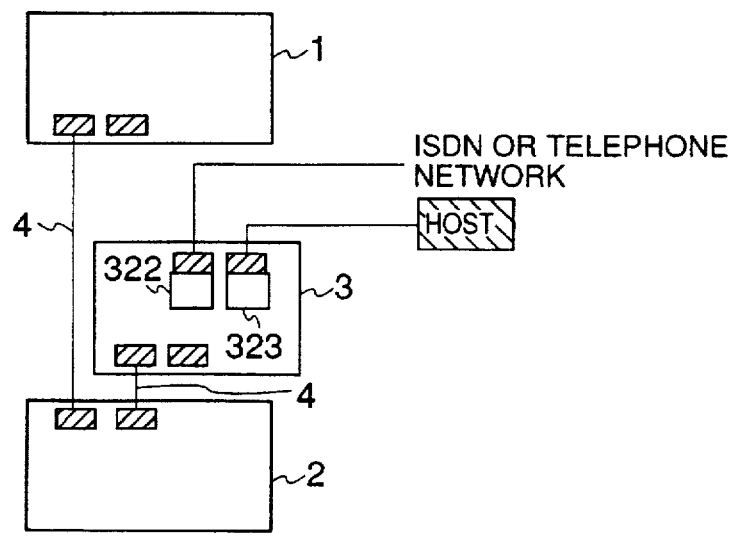
FIG. 12E is an illustration showing a case where the system comprises the image inputting unit, the image outputting unit and the controlling unit so that the system serves as a hybrid system of a high grade printer and a color facsimile machine.

FIG. 12E shows a case where the system comprises the image inputting unit 1, the image outputting unit 2 and the controlling unit 3 so that the system serves as a hybrid system of a high grade printer and a color facsimile machine. The controlling unit 3 comprises means for communicating with an information processing unit 9 (host computer), a print controlling unit 322 and a facsimile communicating unit 322. The print controlling unit 323 converts print data received via the communicating means into raster data. The facsimile communicating unit 322 communicates with a remote facsimile via public service telephone network or ISDN, and applies to the communication data a general facsimile data processing such as a data compression or decompression.

Figure 13:
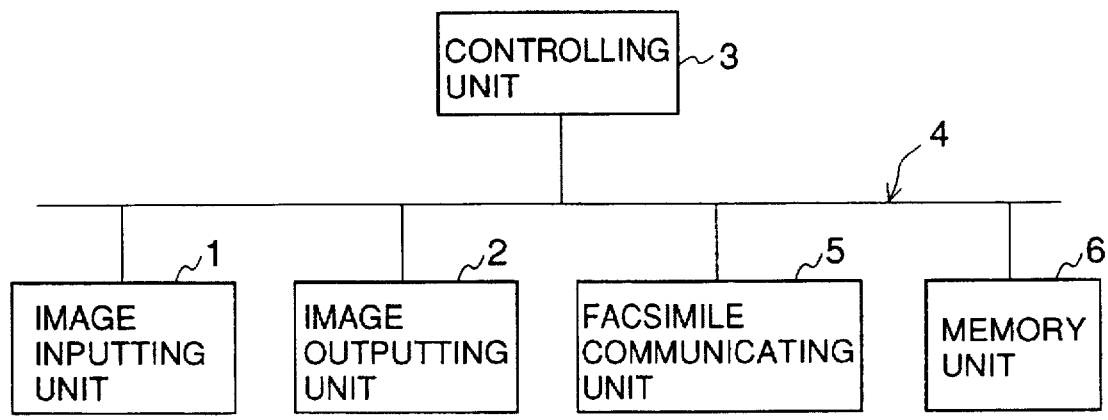
FIG. 13 is an illustration of an example of a system construction according to the present invention.
Figure 14:
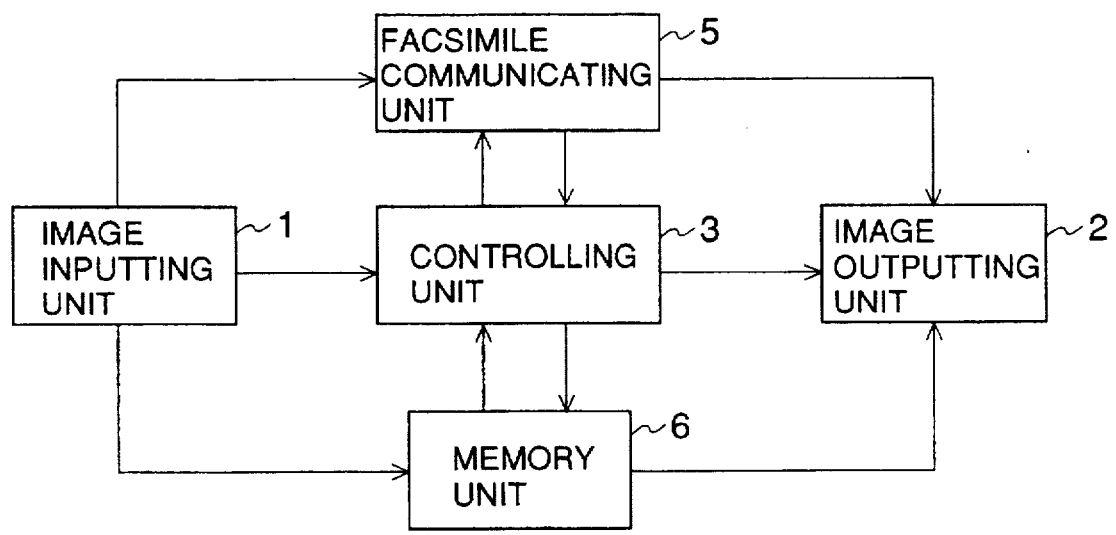
FIG. 14 is an illustration showing a data flow of the system shown in FIG. 13.

FIG. 13 shows a system construction in which the facsimile communication unit 5 which serves similarly to the facsimile communicating unit 322 shown in FIG. 12E is independently provided as a subsystem 5. The system further comprises an independent memory unit 6 such as an optical disk unit or a magnetic disk unit. Data flow of the system shown in FIG. 13 is shown in FIG. 14. In FIG. 14, an arrow indicates the direction of the data flow. For example, when performing a facsimile transmission, image data is scanned by the image inputting unit 1. The image data is transferred to the facsimile communicating unit 5 under the control of the controlling unit 3. The image data is compressed into a predetermined form in the facsimile communication unit 5, and then the compressed data is sent via an external network not shown in the figure. When facsimile reception is performed, received data via the external network is decompressed by the facsimile communication unit 5, and the decompressed data is transferred to the image outputting unit 2.

When the system of FIG. 13 is used as an electronic filing system, image data scanned by the image inputting unit 1 is transferred and stored to the memory unit 6 with additional search information input via the operating unit 31 of the controlling unit 3. The stored image data can be retrieved by inputting search information via the operating unit 31 of the controlling unit 3, and image data information can be displayed on the display unit of the controlling unit 3. When an outputting operation for the image data stored in the memory unit 6 is requested, information for designating the image data to be output is input via the operating unit 31 of the controlling unit 3, and the image data in the memory unit 6 is transferred to the image outputting unit 2 so as to print the image data or the controlling unit 3 so as to display the image data on the display unit.

In the above-mentioned systems, each subsystem such as the image inputting unit 1, image outputting unit 2 or the controlling unit 3 are independently constructed with their own power supplying means. By using such a construction, the various systems are freely constructed. However, a subsystem having a small size or small power consumption may be provided to one of the other subsystems. For example, the controlling unit 3 may be provided either in the image inputting unit 1 or the image outputting unit 2 so that a copying system having the same function and performance as the conventional stand alone copying machine is realized with improved flexibility of installation and operationability. Further, the function of the controlling unit 3 may be incorporated in a personal computer by modifying the personal computer by means of software.

Figure 15:
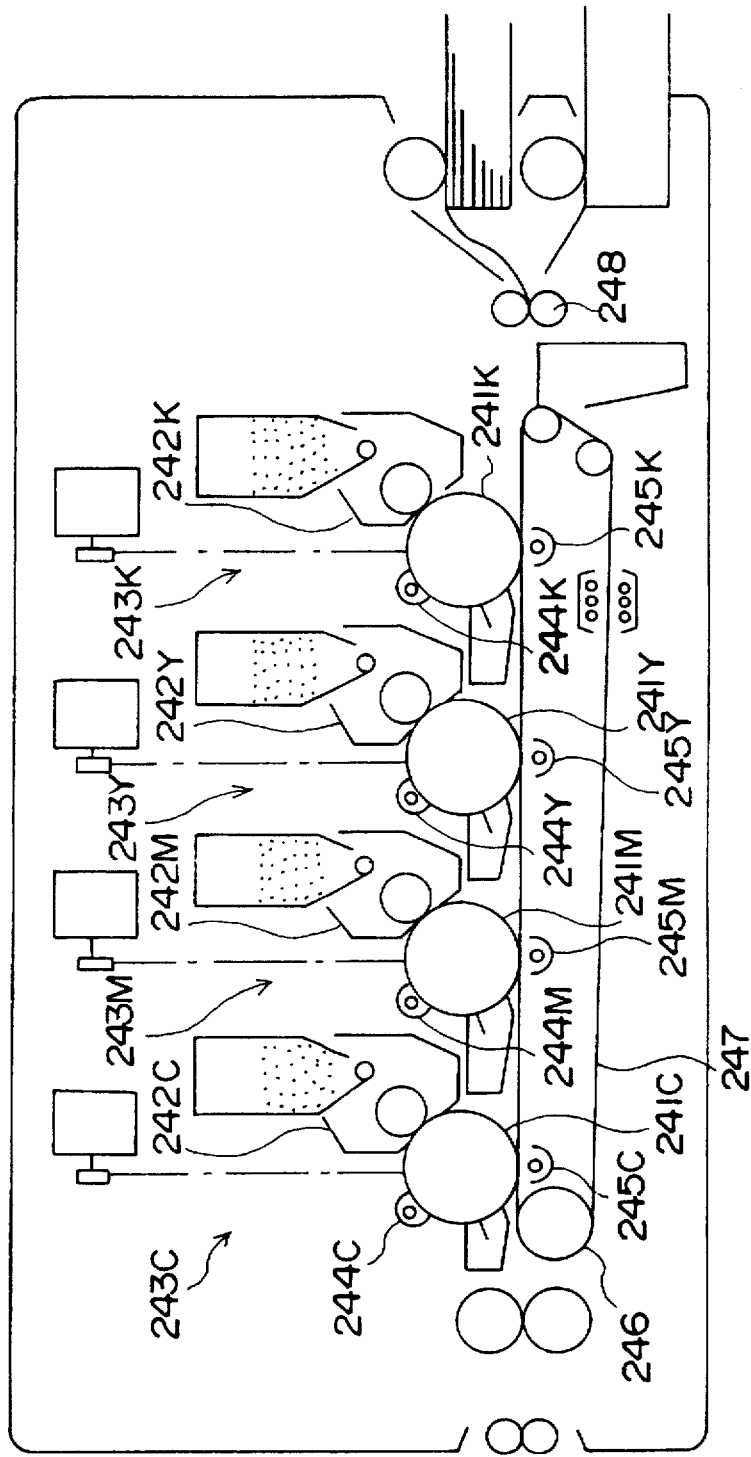
FIG. 15 is an illustration showing a construction of an image outputting unit in which a multi-color image forming operation is performed.

It should be noted that using a higher capacity transmission path, four-color image data can be transmitted simultaneously so that the four color images are consecutively formed. FIG. 15 shows a construction of an image outputting unit by which such a color image forming operation can be realized. As shown in FIG. 15, the image outputting unit comprises four photosensitive drums each corresponding to a color. Suffixes Y, M, C and K indicate yellow, magenta, cyan and black, respectively.

In FIG. 15, a recording paper is conveyed from the left to the right in the figure by a conveying belt 247 which is driven by a conveying pulley 246. Each photosensitive drum 241x (x represents Y, M, C or K) rotates counterclockwise. During the rotation of each photosensitive drum 241x, charging is performed by a charging device 244x; a latent image is formed by an exposure device 243x; development of the latent image to form a toner image is performed by a developing device 242x; transfer of the toner image on to the recording paper is performed by a heat transfer device 245x.

Figure 16:
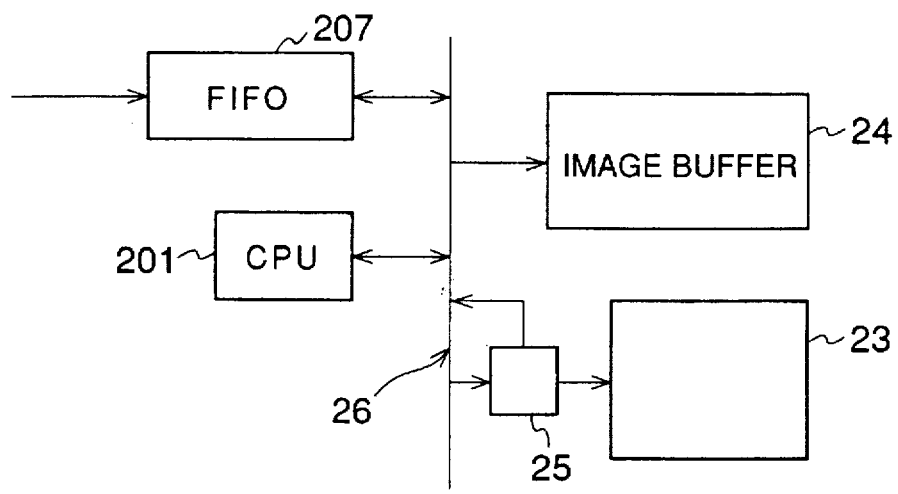
FIG. 16 is a block diagram of a controlling unit of the image outputting unit shown in FIG. 15.

The timing for starting the formation of the image of each color is offset by the time necessary for advancing the conveying belt 247 the distance between adjacent drums. However, since image data of four colors is simultaneously transferred from the image inputting unit, 8-bit/pixel data corresponding to one line is stored in a FIFO buffer 207 shown in FIG. 16. Thereafter, image data corresponding to the first color image to be formed is transferred to a recording controlling circuit 23, and the rest of the data is stored in an image buffer 24. That is, the scanning operation of the 8-bit/pixel data of the image inputting unit and image outputting unit are started in synchronism, and the two scanning operations are performed, similarly to the previously described embodiment, simultaneously. In this construction, the buffer for the first color image, which is black in this case, can be omitted.

In the above construction, by arranging that transfer of all image data corresponding to a single original sheet is completed immediately after the scanning of the single original sheet is completed, all the image data corresponding to the single original sheet has been stored in the image buffer 24 before the latent image forming operation for the second color image is started. Accordingly, 2-bit/pixel image data corresponding to the second image and the following color image is read out from the image buffer 24, and supplied to the recording controlling circuit 23. The recording paper onto which the first color image is transferred is conveyed from the right to the left in the figure, and when the leading edge of the first image formed on the recording paper reaches the transferring position of the second color image, the second color toner image formed on the second color photosensitive drum also reaches the second color transferring position. The second color image is exactly superimposed onto the first color image.

In the present embodiment, the reference point used for synchronization of the scanning operation of the image inputting unit and the scanning operation of the image outputting unit is determined by the transferring timing of the recording paper. Since the writing operation of the image outputting unit should be started at the time when the recording paper has reached a predetermined position, the scanning operation of the image inputting unit 1 has to be started so that image data corresponding to the first line has been stored in the FIFO buffer 207 immediately before the writing operation is started.

In order to achieve this, in the present embodiment, when the recording paper at a register roller 248 starts to be conveyed, scanning start information is sent to the image inputting unit 1. Otherwise, by setting a predetermined point on the path between the register roller 245 and the first color photosensitive drum 245K, scanning start information can be sent to the image inputting unit 1 when the front edge of the recording paper passes the predetermined point.

Figure 17:
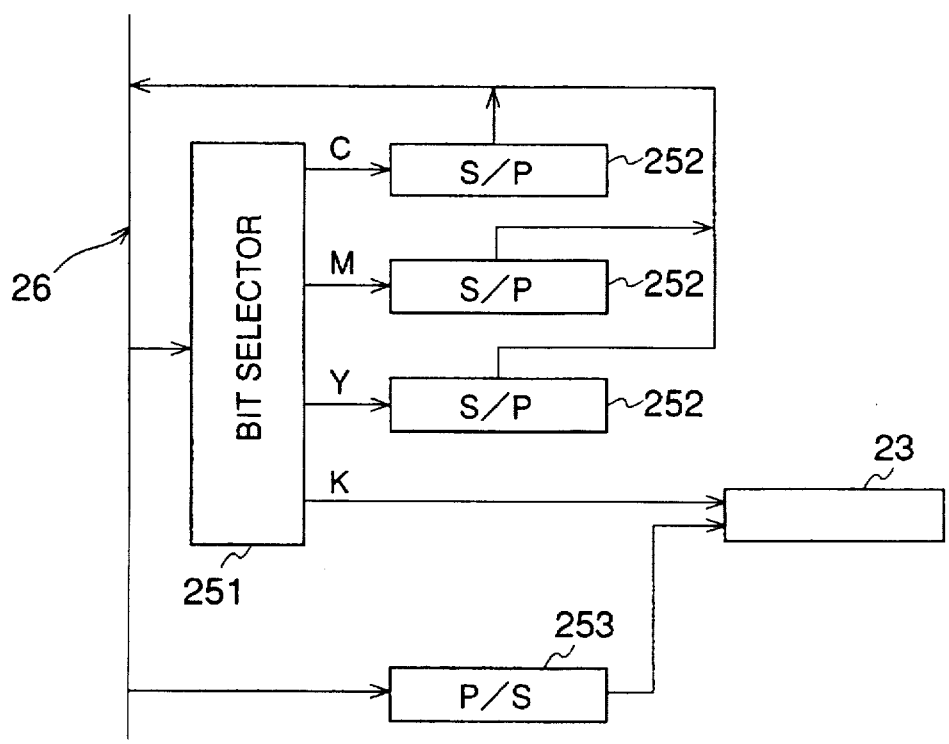
FIG. 17 is a block diagram of an embodiment of a bit selector used for selecting an output of the FIFO shown in FIG. 16.

FIG. 17 shows a construction of an embodiment of a bit selector 25 used for selecting an output of the FIFO 207. The 8-bit parallel data read out from the FIFO 207 is input to a bit selector 251. The bit selector 251 has a selection function in synchronization with a clock signal. The CMY color image data (2 bits per color) is serially output to the corresponding serial/parallel converters 252. The K color image data (2-bit data) is output to the recording controlling circuit 23. After a total of 8 bits are supplied to each serial/parallel converter 252, the 8 bits are output in parallel to the image buffer 24 via a data bus 26, and stored in a predetermined area of the image buffer 24. The data read out from the image buffer 24 is converted into serial data by a parallel/serial circuit 253, and supplied to the recording controlling circuit 23.

The present invention is not limited to the specifically disclosed embodiments, and variations and modifications may be made without departing from the scope of the present invention.

What is claimed is:

1. A copying system comprising:
a shared transmission path for transmitting image data and command signals;
an image inputting unit connected to said transmission path for inputting image data, said image inputting unit including a scanning portion for scanning an original image so as to generate said image data and a first communicating portion for bidirectionally communicating, via said transmission path, so as to transfer said image data and to transmit and receive command signals;

an image outputting unit connected to said transmission path for outputting an output image, said image outputting unit including an image forming portion for forming said output image on a recording sheet and a second communicating portion for bidirectionally communicating via said transmission path so as to receive said image data and to transmit and receive command signals; and a controlling unit for controlling a copying operation performed by said copying system, said controlling unit including an operating unit for inputting operating condition information to maid copying system and a third communicating portion for bidirectionally communicating via said transmission path so as to transmit and receive command signals to/from said image inputting unit and said image outputting unit, said controlling unit initiating said copying operation by sending a predetermined set of said command signals, via said transmission path, to said image inputting unit to initiate a scanning operation and to said image outputting unit to initiate an image forming operation, wherein said image data is transferred directly from said image inputting unit to said image outputting unit, via said transmission path, after said copying operation is initiated, and said scanning operation performed by said scanning portion is performed in synchronism with said image forming operation performed by said image forming portion.

2. The copying system as claimed in claim 1, wherein said transmission path, said image inputting unit, said image outputting unit and said controlling unit are adapted to function under the SCSI interface specification.

3. The copying system as claimed in claim 1, wherein said image inputting unit is shared for use as an image inputting unit by other systems.

4. The copying system as claimed in claim 1, wherein said image outputting unit is shared for use as an image outputting unit by other systems.

5. The copying system as claimed in claim 1, further comprising a memory unit, connected to said transmission path, for storing said image data transferred from said image inputting unit and/or transferred from an external system.

6. The copying system as claimed in claim 1, further comprising a data communication unit connected to said transmission path and having a data communication line for sending/receiving said image data to/from an external data communication unit via said data communication line.

7. The copying system as claimed in claim 1, wherein said image inputting unit has a first housing provided with a first power supply unit and said image outputting unit has a second housing provided with a second power supply unit, and wherein said controlling unit is provided in either said first housing or said second housing.

8. The copying system as claimed in claim 1, further comprising means for reducing an amount of said image data to be transferred to said image outputting unit without deteriorating said output image, wherein a transfer of said image data corresponding to a single scan line and a procedure required for transferring said image data are completed within a duration of a scanning operation of a single scan line performed by said image outputting unit.

9. The copying system as claimed in claim 1, wherein said image outputting unit further comprises a scan command sending portion for sending to said image inputting unit a scan command when said image inputting unit is in a state where said scanning operation can be started, said scanning portion performing said scanning operation only when said scan command is received.

10. The copying system as claimed in claim 9, wherein said image forming portion comprises a rotating member having a reference point, and said scan command sending portion sends said scan command when said reference point reaches a predetermined position.

11. The copying system as claimed in claim 9, wherein said scanning portion further comprises a color image scanning unit in which said image data including data corresponding to a plurality of single-color images is generated, and said image forming portion further comprises a color image forming unit in which said plurality of single-color images are superimposed so as to form a color output image, and wherein said scan command is sent from said image outputting unit to said image inputting unit in synchronization with the scanning operation of the image forming portion for each of said single-color images.

12. The copying system as claimed in claim 9, wherein said scan command is sent to said image inputting unit at a time when said recording sheet starts to be conveyed toward said image forming portion.

13. The copying system as claimed in claim 9, wherein said scan command is sent to said image inputting unit at a time when a front edge of said recording sheet reaches a predetermined distance from said image forming portion.

14. The copying system as claimed in claim 9, wherein said scanning portion further comprises a color image scanning unit in which said image data including data corresponding to a plurality of single-color images is generated, and said image forming unit further comprises a color image forming unit in which said plurality of single-color images are superimposed so as to form a color output image, said color image forming unit further comprising a plurality of single-color image forming units arranged along a conveying line conveying said recording sheet, and wherein said scan command is sent to said image inputting unit at a time when said recording sheet starts to be conveyed toward one of said single-color image forming units.

15. The copying system as claimed in claim 9, wherein said scanning portion further comprises a color image scanning unit in which said image data including data corresponding to a plurality of single-color images is generated, and said image forming portion further comprises a color image forming unit in which said plurality of single-color images are superimposed so as to form a color output image, said color image forming unit comprising a plurality of single-color image forming units arranged along a conveying line conveying said recording sheet, and wherein said scan command is sent to said image inputting unit at a time when a front edge of said recording sheet reaches a predetermined distance from one of said single-color image forming units.

16. The copying system as claimed in claim 9, wherein said scanning unit comprises a color image scanning unit in which said image data including data corresponding to a plurality of single-color images is generated, and said image forming portion further comprises a color image forming unit in which said plurality of single color images are superimposed so as to form a color output image, said color image forming unit further comprising a plurality of single-color image forming units arranged along a conveying line conveying said recording sheets, and wherein image data for all colors is transferred to said image outputting unit before a first single-color image forming operation is completed.

17. The copying system as claimed in claim 16, wherein said image outputting unit comprises an image buffer storing image data other than said first single-color image data.

18. The copying system as claimed in claim 1, wherein said scanning portion scans said original image at a first scanning speed, and said image forming portion scans to form said output image at a second scanning speed, and wherein said image inputting unit further comprises a scanning speed changing portion for changing said first scanning speed so that said first scanning speed is equal to said second scanning speed.

19. The copying system as claimed in claim 18, wherein said second scanning speed is passed to said image inputting unit before said scanning portion starts a scanning operation.

20. The copying system as claimed in claim 19, wherein said image inputting unit receives from said controlling unit command information including said second scanning speed for initiating a copying operation.

21. The copying system as claimed in claim 9, wherein said image outputting unit further comprises a read command sending portion for sending to said image inputting unit a read command when a predetermined period has elapsed since said scan command is sent to said image inputting unit, said image inputting unit sending to said image outputting unit said image data when said read command is received.

22. The copying system as claimed in claim 21, wherein said image inputting unit comprises a line buffer for storing said image data generated by said scanning portion, said line buffer storing said image data corresponding to at least one line, said image data stored in said line buffer being transferred to said image outputting unit when said read command is received.

23. The copying system as claimed in claim 22, wherein a capacity of said line buffer is determined in accordance with a sending timing of said scan command and said read command.

24. The copying system as claimed in claim 22, wherein said scanning portion scans said original image at a first scanning speed, and said image forming portion scans to form an output image at a second scanning speed, said line buffer having a capacity determined in accordance with a difference between said first scanning speed and said second scanning speed.

25. The copying system as claimed in claim 21, wherein said first scanning speed is set to be equal to said second scanning speed, said difference between said first scanning speed and said second scanning speed occurring due to tolerances of said first scanning speed and said second scanning speed.

26. The copying system as claimed in claim 18, wherein said scanning speed changing portion comprises means for setting said scanning portion so that said scanning portion intermittently performs a scanning operation, said first scanning speed being defined as an average scanning speed of said scanning portion.

27. The copying system as claimed in claim 26, wherein said first scanning speed is faster than said second scanning speed, and said scanning portion comprises a stepping motor for providing said first scanning speed, and wherein said stepping motor is stopped for a period determined by a combination of said first scanning speed and said second scanning speed at least between the operation of scanning each single scan line.

28. The copying system as claimed in claim 27, wherein said stepping motor is restarted, after being stopped for said period, in synchronization with a timing of an image data transfer request.

29. An image inputting unit used for a copying system having an image outputting unit, said image inputting unit being connected to said image outputting unit via a commonly shared transmission path, said image inputting unit comprising: a scanning portion for scanning an original sheet so as to generate image data; and a communicating portion for bidirectionally communicating via said transmission path so as to transfer said image data to said image outputting unit, wherein said image data is transferred directly from said image inputting unit to said image outputting unit via said communicating portion and said transmission path after a copying operation is initiated, and a scanning operation performed by said scanning portion is performed in synchronization with an image forming operation performed by said image outputting unit.

30. An image outputting unit used for a copying system having an image inputting unit, said image outputting unit being connected to said image inputting unit via a commonly shared transmission path, said image outputting unit comprising: an image forming portion for forming an output image on a recording sheet in accordance with image data transferred from said image inputting unit; and a communicating portion for bidirectionally communicating via said transmission path so as to receive said image data, wherein said image data is transferred directly from said image inputting unit to said image outputting unit via said transmission path and said communicating portion after a copying operation is initiated, and an image forming operation of said image forming portion of said image outputting unit is performed in synchronization with a scanning operation performed by said image inputting unit.

\* \* \* \* \*